Feb. 16, 1932.  R. A. BRAZEE  1,845,782
WINDSHIELD WIPER
Filed March 29, 1930

Inventor:
Ralph A. Brazee.
by Charles L. Gooding,
Atty.

Patented Feb. 16, 1932

1,845,782

UNITED STATES PATENT OFFICE

RALPH A. BRAZEE, OF LEXINGTON, MASSACHUSETTS

WINDSHIELD WIPER

Application filed March 29, 1930. Serial No. 439,951.

This invention relates to an improvement in windshield wipers and particularly to an anti-freeze attachment for a wiper blade.

The object of the invention is to provide a device that may be easily and quickly attached to the blade of a windshield wiper in cases of emergency such, for example, as in wet freezing weather, and be utilized to prevent snow, sleet and ice from gathering and freezing upon that portion of the windshield engaged by the wiper blade.

Another object of the invention is to so construct the device that it may be applied to wiper blades of different lengths without it being necessary to make adjustments.

The invention consists in an attachment for a blade of a windshield wiper as set forth in the following specification and particularly as pointed out in the claims thereof.

Referring to the drawings:—

Like numerals refer to like parts throughout the several views of the drawings.

Figure 1:
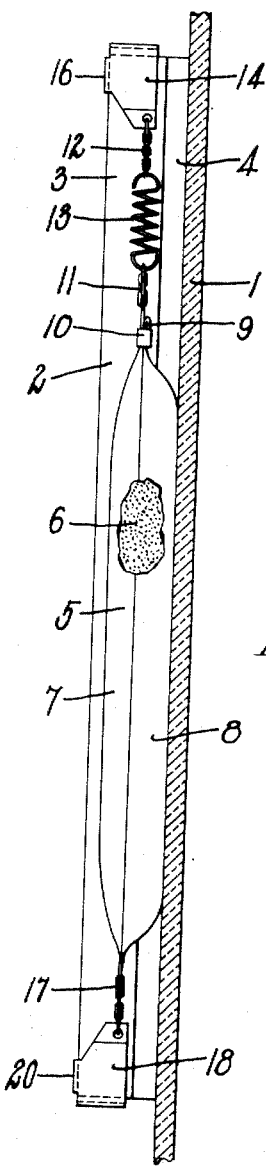
Fig. 1 represents a side elevation of a wiper blade together with an anti-freeze attachment embodying my invention mounted thereon and contacting with a windshield which is illustrated in section.
Figure 2:
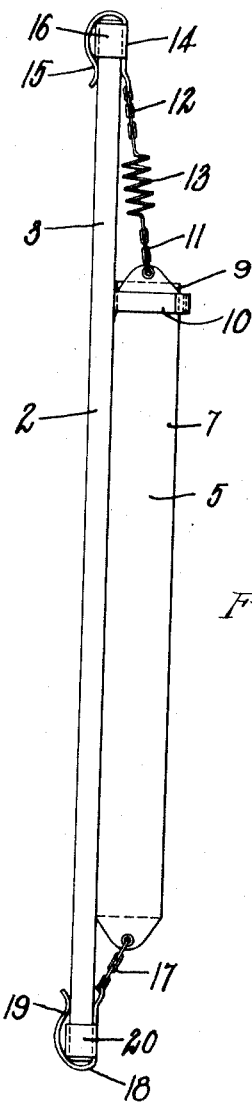
Fig. 2 is a rear elevation of the wiper blade and attachment mounted thereon.

In the drawings, 1 is a portion of a windshield. 2 is a well-known form of wiper blade consisting of a holder 3 and a strip or strips of rubber 4. Mounted upon the blade 2 is a container 5 for a soluble anti-freeze material 6 such, for example, as common table salt. The container 5 consists of a cloth bag, one side of which consists of a strong fabric 7 and the other side consisting of a soft porous fabric 8, the two materials being stitched together lengthwise of the bag and the soft porous side of the bag being adapted to contact with the glass of the windshield.

Figure 3:
Fig. 3 is a perspective view of the spring clip that is utilized for closing the open end of the container.

The materials 7 and 8 of the opposite sides of the container 5 are separable at the top thereof at 9 in order that the container may be refilled when necessary, and a spring clip 10, illustrated in detail in Fig. 3, is utilized for the purpose of holding the separable portions tightly closed together, in order that there will be no seepage therebetween when the container is tipped or inverted.

The top portion of the container 5 is secured to the top of the wiper blade by means of an extensible flexible connection consisting of short sections of chains 11 and 12 and an intervening coil spring 13, the chain section 11 being secured to the top of the container 5 and the chain section 12 being secured to a clamp 14 which extends around the upper extremity of the wiper blade. The clamp 14 embodies therein a resilient spring portion 15 which has yielding engagement with a side of the holder 3 of the wiper blade, and a stop 16 also formed integral with the clamp 14 engages the rounded back edge of the holder 3 and positions the clamp 14 upon the holder.

The lower portion of the container 5 is secured to the lower portion of the wiper blade by means of a flexible connection consisting of a short length of chain 17 which is attached directly to a clamp 18 similar to the clamp 14 and embodying therein a resilient spring portion 19 which yieldingly engages a side of the holder 3. A stop 20, furthermore, provided upon the clamp 18 engages the curved rear edge of the holder 3 and acts to position the clamp 18 upon said holder.

The general operation of the device hereinbefore specifically described is as follows:—

When it is found that snow and sleet falling upon the windshield is not being properly removed by the operation of the wiper blade 2, the device of this invention is attached to said blade, the clamps 14 and 18 being sprung into engagement with the upper and lower portions respectively of the blade.

In attaching the container to the blade the spring 13 is extended, as required, to compensate for the different lengths of wiper blades, and said spring also acts to hold the container stretched and in close contact with the surface of the windshield.

As the wiper blade oscillates over the surface of the windshield, the moisture that is continually gathering upon said surface penetrates the soft porous material 8 of the container 5 and gradually contacts with the soluble material which is located therein, and this material will dissolve slowly and seep through the porous material and be gradually deposited upon the outer surface of the windshield, thereafter preventing any moisture from freezing upon the windshield and also melting any ice that may have formed thereon before the device was put in operation. Not only will the surface of the windshield that is engaged by the container be kept free from ice, but also that portion of the windshield located directly beneath the container 5, which is engaged by the portion 4 of the wiper blade, it being evident that a certain portion of the dissolved anti-freeze material that is deposited upon the surface of the windshield will seep downwardly gradually upon the windshield.

When the emergency has passed the device can be instantly removed from the wiper blade and stored away for future use.

I claim:

1. An attachment for the blade of a windshield wiper comprising, in combination, a porous container for an anti-freeze material, clamps adapted to yieldingly grip the blade at opposite ends thereof respectively, resilient means attached to the container and adapted to secure the latter to one of said clamps, and a flexible connection between the container and the other of said clamps.

2. An attachment for the blade of a windshield wiper comprising, in combination, a porous container for an anti-freeze material, means to grip the end portions of said blade, and flexible means connecting the container with said gripping means and adapted to hold the container in contact with the windshield.

3. An attachment for the blade of a windshield wiper comprising, in combination, a pair of clamps adapted to grip the end portions of said blade, and a container for a soluble anti-freeze material suspended under tension between said clamps and adapted to engage the windshield.

4. An attachment for the blade of a windshield wiper comprising, in combination, a porous container for an anti-freeze material, spring clamps adapted to grip the blade at opposite ends thereof respectively, each of said clamps having a stop embodied therein adapted to engage the back edge of the blade and position the clamp thereon, flexible means connecting the container with said clamps, and means for placing a tension upon the container.

In testimony whereof I have hereunto set my hand.

RALPH A. BRAZEE.